United States Patent [19]

Hudson

[11] 4,162,399
[45] Jul. 24, 1979

[54] OPTICAL ENCODER WITH FIBER OPTICS

[75] Inventor: Charles L. Hudson, North Little Rock, Ark.

[73] Assignee: BEI Electronics, Inc., Little Rock, Ark.

[21] Appl. No.: 833,817

[22] Filed: Sep. 16, 1977

[51] Int. Cl.$^2$ ............................................. G01D 5/34
[52] U.S. Cl. .............................. 250/231 SE; 250/227; 324/175
[58] Field of Search .................. 250/227, 231 SE; 324/175

[56] References Cited

U.S. PATENT DOCUMENTS

| | | | |
|---|---|---|---|
| 3,364,359 | 1/1968 | Cronin | 250/231 SE |
| 3,575,129 | 4/1971 | Sullivan | 324/175 X |
| 3,706,874 | 12/1972 | Lockard | 250/227 X |
| 3,778,157 | 12/1973 | Brelot et al. | 250/227 X |
| 3,786,238 | 1/1974 | Heisner | 250/227 X |
| 3,875,405 | 4/1975 | Ferguson | 250/231 SE X |
| 3,906,223 | 9/1975 | White | 250/231 SE |
| 3,947,691 | 3/1976 | Goldstein | 250/227 X |
| 4,064,504 | 12/1977 | Lepetit et al. | 250/231 SE X |

FOREIGN PATENT DOCUMENTS 2505802  8/1976  Fed. Rep. of Germany ........... 324/175

Primary Examiner—James B. Mullins
Attorney, Agent, or Firm—Burmeister, York, Palmatier, Hamby & Jones

[57]  ABSTRACT

Light is modulated by an optical code member having first and second parallel tracks, each with alternate segments of different optical characteristics, such as optical reflectivity. The different segments are staggered between the parallel tracks. The modulated light is transmitted along first and second fiber optic elements from the first and second tracks to respective first and second photoelectric sensors having a common substrate to produce push-pull electrical outputs from said sensors. The light may be supplied to the first and second tracks by respective third and fourth fiber optic elements, which may extend from a common light source. The third and fourth fiber optic elements may have light supplying ends which are closely adjacent the light receiving ends of the first and second fiber optic elements.

1 Claim, 11 Drawing Figures

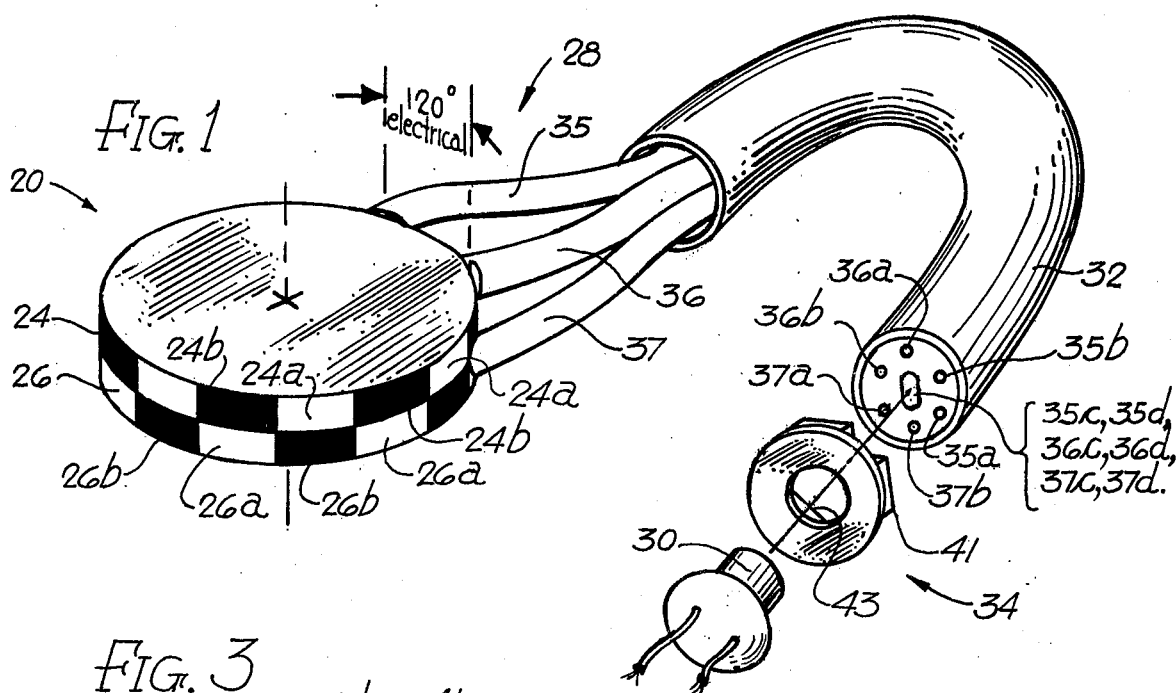
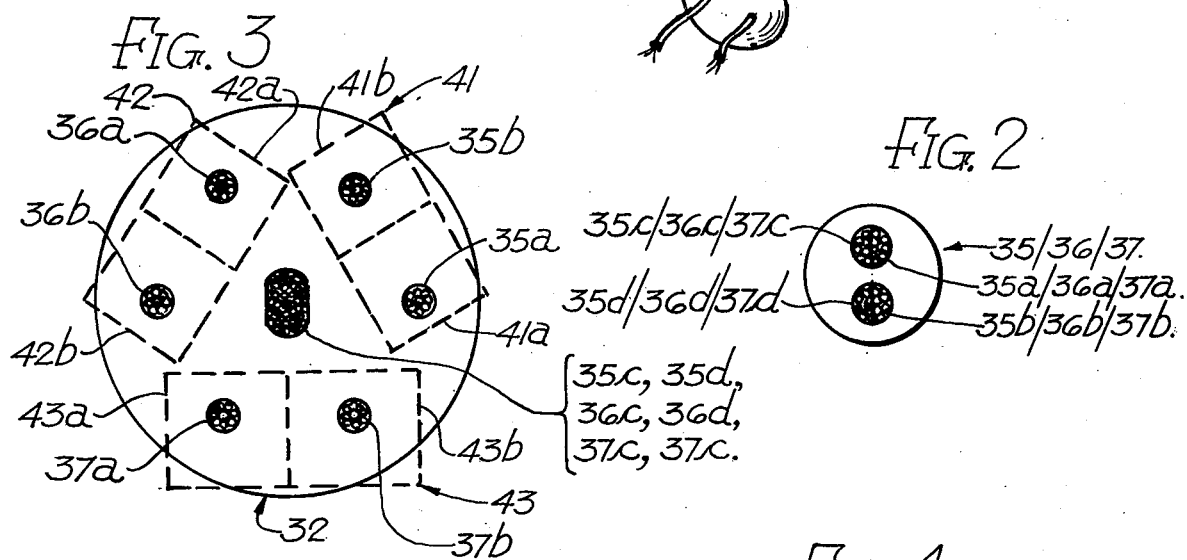
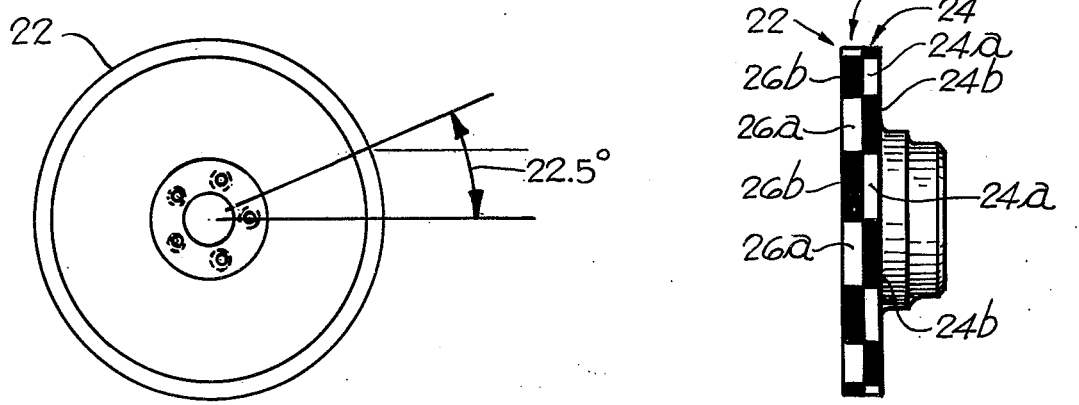
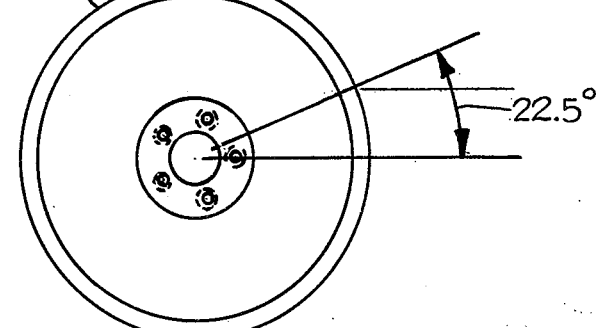

OPTICAL ENCODER WITH FIBER OPTICS

This invention relates to an optical encoder for producing electrical signals which indicate the position of a code member.

One object of the present invention is to provide a new and improved encoder of the optical type, in which the code member is adapted to interrupt or modulate a light beam, which is then transmitted to a photoelectric sensor or transducer, for producing electrical signals corresponding to the modulated light beam.

A further object is to provide a new and improved optical encoder which is adapted to produce balanced push-pull output electrical signals.

Another object is to provide a new and improved optical encoder in which the photoelectric sensors may be located remotely from the code member, so that the photoelectric sensors may be located in a controlled environment, eventhough the code member is located in a hostile or difficult environment.

A further object is to provide a new and improved encoder which is not only capable of optically reading a code member in an environment too hostile for electronic components, but also is highly convenient, versatile and low in cost, so that the encoder will have many advantageous applications where the environment is less hostile.

Another object is to provide a new and improved encoder which is highly compact so as to be usable in applications which are subject to severe space limitations.

A further object is to provide a new and improved optical encoder capable of commutating a motor or the like with angular accuracies comparable with those achieved by conventional brush-type commutators.

To achieve these and other objects, the present invention preferably provides an optical encoder comprising a code member having first and second parallel tracks, each having alternate segments of different optical characteristics. Thus, the alternate segments may differ in optical reflectivity, for example. First and second fiber optic elements extend from the first and second tracks to respective first and second photoelectric sensors, so that light is transmitted between the tracks and the sensors. In response to the light modulated by the tracks, the sensors produce push-pull electrical signals. Preferably, the sensors have a common substrate to produce a balanced push-pull output.

Light may be supplied to the encoder tracks by third and fourth fiber optic elements, extending from a common light source to the respective first and second tracks on the code member.

The light supplying ends of the third and fourth fiber optic elements are preferably closely adjacent the light receiving ends of the respective first and second fiber optic elements.

Further objects, advantages and features of the present invention will appear from the following description, taken with the accompanying drawings, in which:

FIG. 1 is a diagrammatic perspective view of an optical encoder to be described as an illustrative embodiment of the present invention.

FIG. 2 is an enlarged end view illustrating the encoder end of one of the fiber optic cables employed in the encoder of FIG. 1.

FIG. 3 is a diagrammatic enlarged end view illustrating the photoelectric sensors and the sensor end of the fiber optic cable assembly for the encoder of FIG. 1.

FIGS. 4 and 5 are edge and end views of the optical code wheel for the encoder of FIG. 1.

Figure 6:
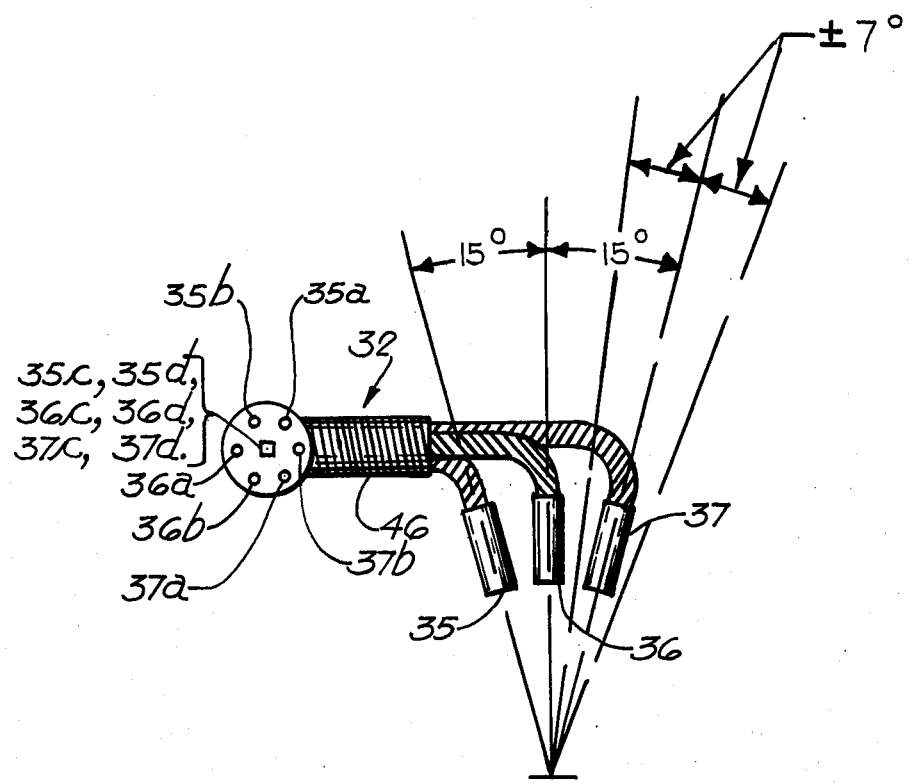
FIGS. 6 and 7 are elevational and plan views of the fiber optic cable assembly for the encoder of FIG. 1.
Figure 7:
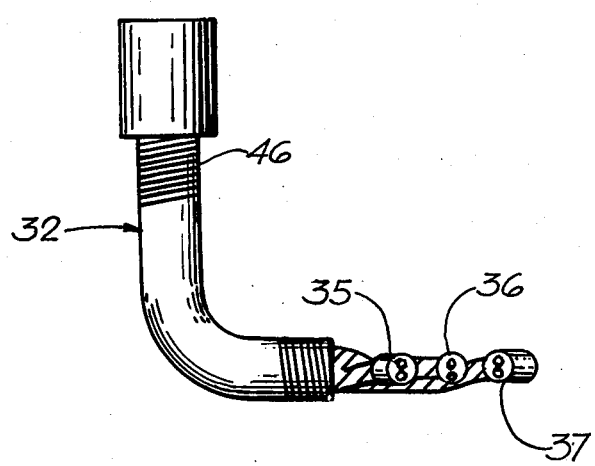

As just indicated, FIG. 1 illustrates an optical encoder 20 adapted to produce electrical signals corresponding to the position of a code member 22. The encoder 20 will find many applications, but is particularly well adapted for commutating an electric motor.

The code member 22 may assume various forms, such as linear or rotary, according to the type of motion which is to be encoded. The illustrated code member 22 is in the form of a rotary code wheel, adapted to encode rotary movement, such as the rotation of a motor shaft, to which the code wheel may be connected. The code wheel 22 may be mounted in any orientation, such as horizontal, vertical or inclined.

One or more code tracks are provided on the code wheel 22. These tracks are adapted to be optically read. The code wheel 22 is illustrated in FIGS. 4 and 5, as well as in FIG. 1. The illustrated code wheel 22 has two parallel tracks 24 and 26, which are circular in shape. In this case, the tracks 24 and 26 extend around the cylindrical periphery of the wheel 22. However, the code wheel 22 could be in the form of a disk, with the tracks on one of the radial faces of the disk.

Various types of encoding could be provided along the parallel tracks 24 and 26. The illustrated tracks 24 and 26 advantageously provide alternate code segments 24a and b and 26a and b having different optical characteristics. As shown, the alternate segments a and b differ in optical reflectivity, inasmuch as the optical code wheel 22 is of the light reflective type. Thus, the segments 24a and 26a may have high reflectivity, while the segments 24b and 26b may have low reflectivity. For example, the segments a may be plated with a highly reflective material, such as gold, while the segments b may be plated with a material having low reflectivity, such as black chrome.

The alternate code segments are preferably staggered between the two parallel tracks 24 and 26. Thus, the highly reflective segments 24a are opposite the segments 26b of low reflectivity, while the segments 24b of low reflectivity are opposite the highly reflective segments 26a.

One or more cycles of the alternate segments a and b may be provided around the parallel tracks 24 and 26. In the construction of FIGS. 1, 4 and 5, there are eight cycles of the alternate segments a and b around each track 24 and 26. The segments are substantially equal in angular extent, amounting to 22.5 degrees. Each cycle comprises 45 degrees.

The encoder 20 of FIG. 1 comprises optical reading means 28 for reading the code tracks 24 and 26 on the code member 22, to produce electrical signals which will indicate the position and movement of the code member. Generally, the optical reading means 28 comprise illuminating means for supplying light to be interrupted or modulated by the code tracks 24 and 26, and signal producing means for producing electrical signals corresponding to the modulated light. In the illustrated encoder 20, the light is advantageously supplied by a common light source 30, and is transmitted to the code tracks 24 and 26 by a fiber optic cable assembly 32. While the code member 22 could be of the light transmitting type, the illustrated code member 22 is of the reflective type so that the incident light is reflected and modulated by the code tracks 24 and 26. The reflected and modulated light is transmitted by the fiber optic cable assembly 32 to photoelectric detector means 34, adapted to convert the modulated light into electrical signals.

The provision of the fiber optic cable assembly 32 makes it possible to locate the light source 30 and the photoelectric detector means 34 remotely from the code member 22, so that the light source and the photoelectric detector means may be provided with a controlled environment which is favorable to the efficient and stable operation of the light source and the photoelectric detector means, eventhough it is necessary or desirable to locate the code member 22 in a hostile or unfavorable environment, which may be too hostile for the light source 30 or the photoelectric detector means 34 to survive, or to operate in a reliable manner.

The light source 30 may advantageously be in the form of a light emitting diode (LED), but it could also be in any other suitable form, such as an incandescent lamp, a gaseous discharge lamp, or a laser, for example.

The illustrated fiber optic cable assembly 32 has three branches or cables 35, 36 and 37 which are opposite three angularly spaced locations around the code wheel 22. Preferably, the spacing between these locations is approximately 120 electrical degrees. For a code cycle length of 45 degrees, as previously indicated, the electrical spacing of 120 degrees corresponds to a mechanical spacing of 15 degrees, as shown in FIGS. 1 and 6.

As shown most clearly in FIG. 2, each of the fiber optic cables 35, 36 and 37 preferably includes four fiber optic elements designated by the suffixes a, b, c and d. For each fiber optic cable 35/36/37, the first and third fiber optic elements a and c are opposite the first code track 24, while the second and fourth fiber optic elements b and d are opposite the second code track 26.

It will be understood that each of the fiber optic elements comprises a bundle of optical fibers. The first and second fiber optic elements a and b extend to the photoelectric detector means 34, while the third and fourth fiber optic elements c and d extend to the light source 30.

Thus, in each fiber optic cable 35/36/37, the third and fourth fiber optic elements c and d transmit light from the light source 30 and provide light beams to illuminate the code tracks 24 and 26. The first and second fiber optic elements a and b transmit the reflected and modulated light from the code tracks 24 and 26 to the photoelectric detector means 34.

In the case of each fiber optic cable 35/36/37, the ends of the fiber optic elements a, b, c and d are closely spaced from the code tracks 24 and 26 on the code member 22. Such spacing is not critical and may be approximately 0.030 of an inch, for example. The light receiving end of the first fiber optic element a is closely adjacent the light transmitting end of the third fiber optic element c. Similarly, the light receiving end of the second fiber optic element b is closely adjacent the light transmitting end of the fourth fiber optic element d. As shown in FIG. 2, the ends of the four fiber optic elements a, b, c, and d cover semi-circular areas. The semi-circular ends of the first and third elements a and c combine to cover a circular area. The boundary line between the first and third fiber optic elements a and c extends along a diameter of such circular area and is parallel with the boundary lines between the alternate segments 24a and b of the first code track 24. Similarly, the boundary line between the second and fourth fiber optic elements b and d extends along a diameter of the circular area and is parallel with the boundary line between the alternate segments 26a and b of the second code track 26.

FIGS. 1, 3 and 6 show the remote end of the fiber optic cable assembly 32, the remote end being shown most clearly in FIG. 3. As shown, the light source fiber optic elements 35c, 35d, 36c, 36d, 37c and 37d are preferably combined into a single bundle which is centrally located, opposite the light source 30. The detector fiber optic elements 35a, 35b, 36a, 36b, 37a and 37b are terminated at six separate locations, preferably spaced at equal angular intervals around a circle which is centered relative to the central source bundle. The detector fiber optic elements are opposite the photoelectric detector means 34.

As illustrated in FIGS. 1 and 3, the photoelectric detector means 34 preferably comprise three dual photoelectric sensors 41, 42 and 43, each taking the form of a common substrate having two sensor elements a and b. The sensors may be photosensitive transistors, but may also be photosensitive diodes, electrical resistance elements or photovoltaic elements, such as solar cells. The provision of two photoelectric sensors on a common substrate makes it possible to produce a highly precise balance between the two sensors.

It will be recalled that the alternate segments a and b of the code tracks 24 and 26 are staggered. Thus, there is a displacement of 180 electrical degrees between the two code tracks 24 and 26. This results in the production of balanced push-pull output signals from the pairs of photoelectric sensors 41a and b, 42a and b, and 43a and b. The provision of a common substrate for each pair of sensors enhances the balance between the push-pull outputs.

Various mechanical details of the optical encoder 20 are shown in FIGS. 8-11. It will be seen that the encoder 20 is provided with two complete optical reading means 28, spaced apart at diametrically opposite points around the code wheel 22. Each optical reading means or unit 28 has its own separate fiber optic cable assembly 32, which may have an armored sheath 46.

Figure 9:
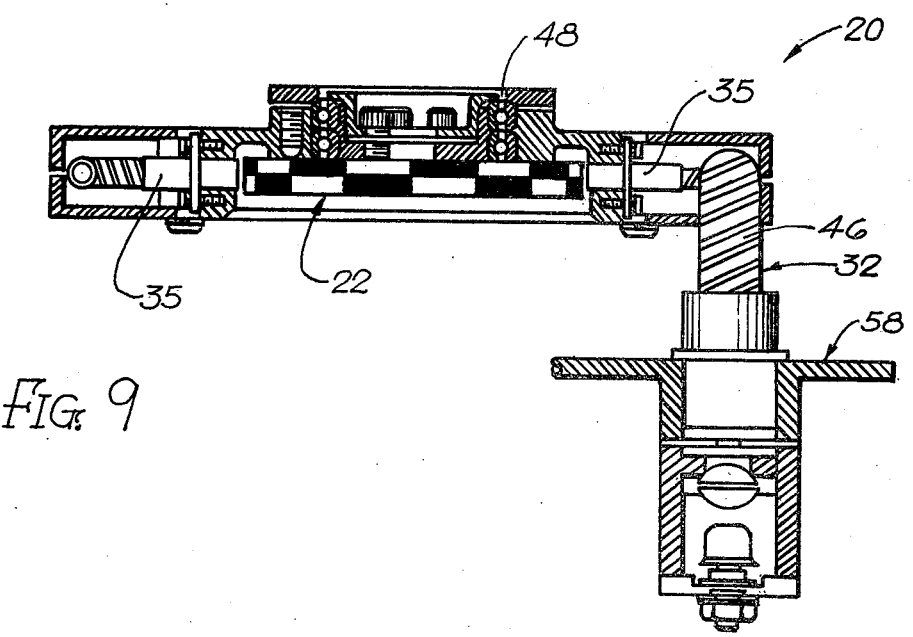
FIG. 9 is a sectional view, taken generally along the broken line 9—9 in FIG. 8.

As shown in FIG. 9, the code wheel 22 is rotatably supported by bearings 48, illustrated as anti-friction ball bearings.

Figure 8:
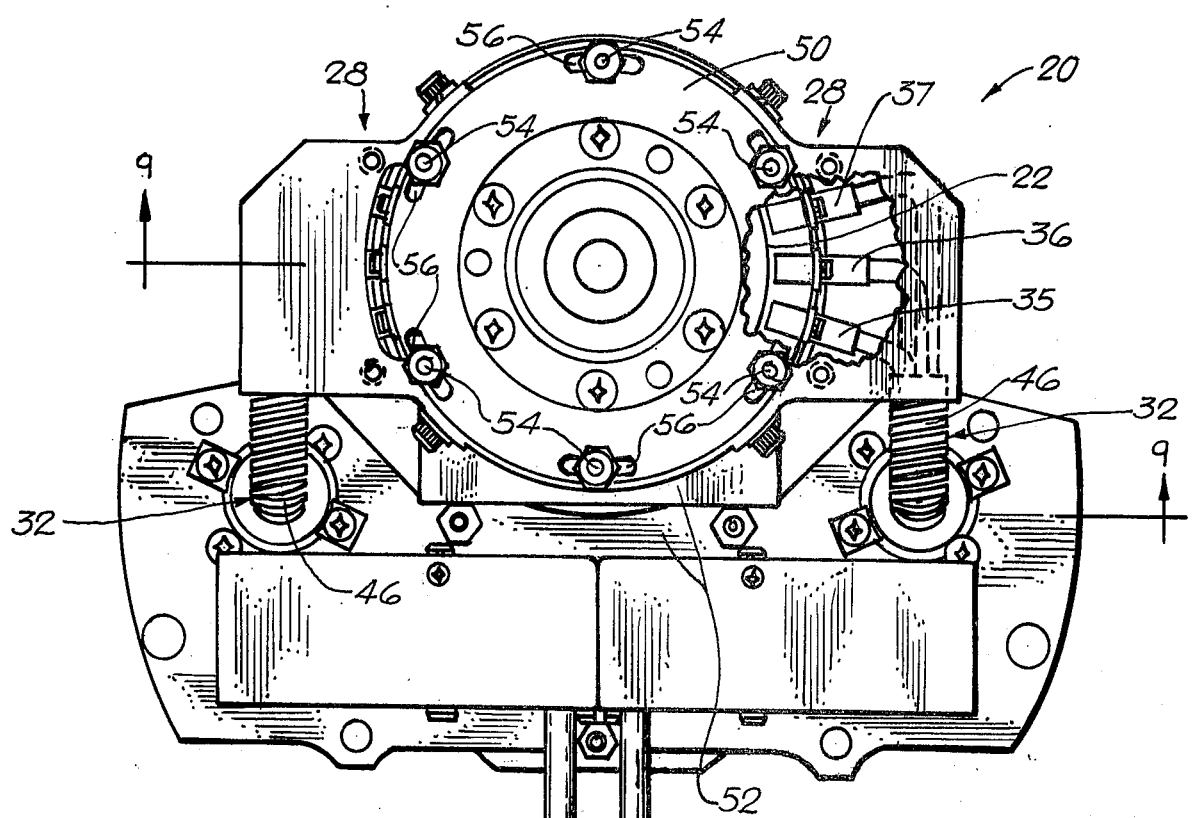
FIG. 8 is an end elevation of the optical encoder, corresponding to the diagrammatic representation of FIG. 1.

As illustrated in FIGS. 8 and 9, the three fiber optic cables 35, 36 and 37 of each cable assembly 32 are clamped or otherwise mounted in an adjustable supporting ring 50, secured to a stationary frame 52 by clamping bolts 54 which extend through slots 56, whereby the angular orientation of the ring 50 can be adjusted through a limited range, such as 7 degrees, for example. The supporting ring 50 is adjusted by loosening the bolts 54 and turning the ring. The bolts 54 are then tightened to maintain the adjustment. All three fiber optic cables 35, 36 and 37 of each cable assembly 32 are shifted angularly when the ring 50 is adjusted.

Figure 10:
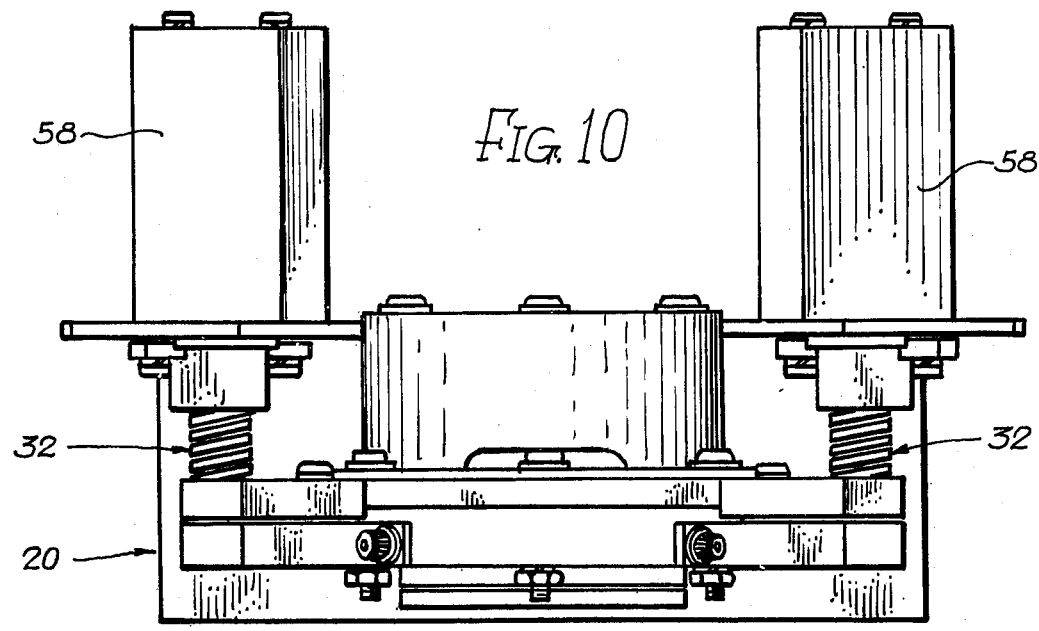
FIG. 10 is a plan view of the encoder.
Figure 11:
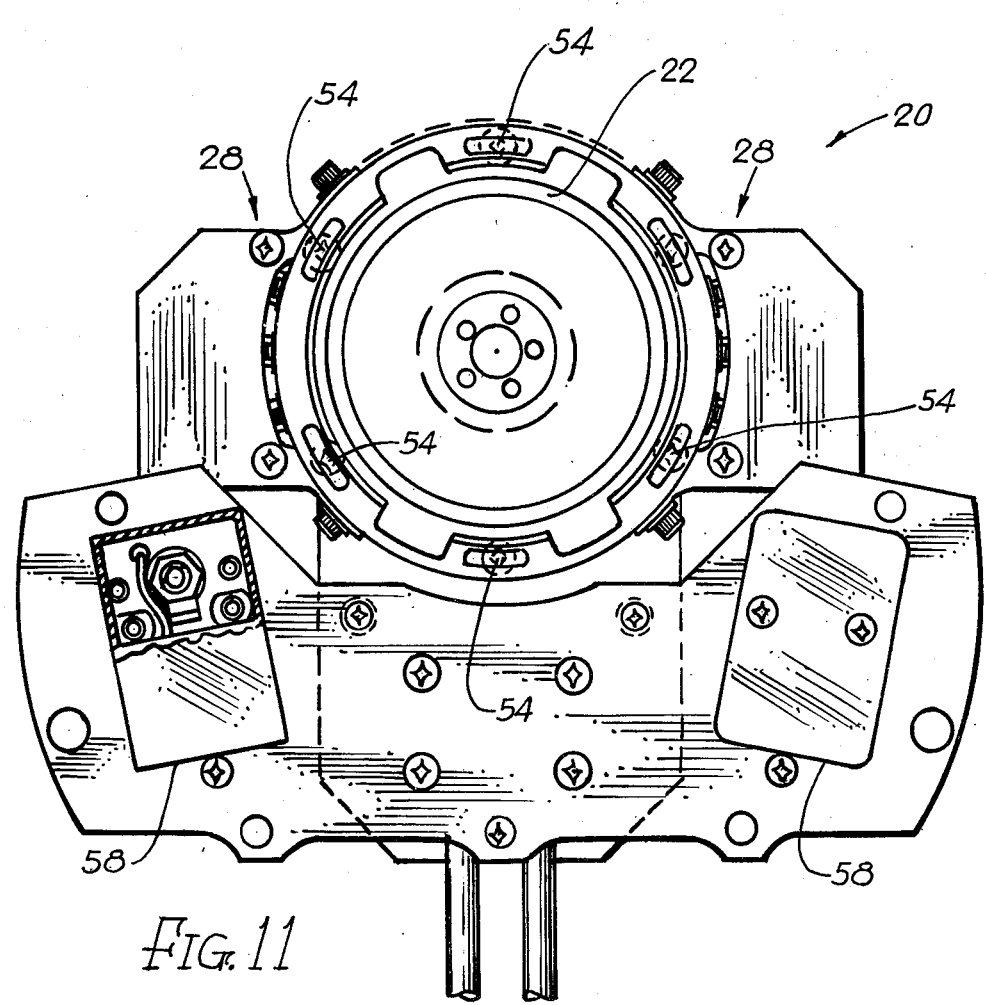
FIG. 11 is an opposite end elevation of the encoder shown in FIG. 8.

As shown in FIGS. 8 and 10, each fiber optic cable assembly 32 extends into its own sensor housing 58, in which the photoelectric sensor means 34 and the light source 30 are housed. A controlled environment may be maintained within the housing 58. Thus, for example, the atmospheric pressure, composition and temperature may be controlled or maintained within the housing 58, so that the environment will be favorable for the long life and efficient operation of the light source 30 and the photoelectric sensor means 34. Electronic amplifiers and other electronic components may also be mounted within each housing 58. It will be understood that the mechanical details of the encoder 20 may be varied to suit a variety of conditions.

In the operation of the encoder 20, the code member or wheel 22 is generally connected to a rotatable member, the movement of which is to be encoded. For example, the code wheel 22 may be connected to the rotatable shaft of an electric motor. During operation, the rotation of the code wheel 22 results in relative movement between the code wheel and the fiber optic cables 35, 36 and 37.

The first and second parallel code tracks 24 and 26 of the code wheel 22 are illuminated by light beams which are produced by the light source 30 and are transmitted to the code tracks by the fiber optic elements 35c, 35d, 36c, 36d, 37c and 37d, contained within the fiber optic cables 35, 36 and 37. These light beams are reflected and modulated by the alternate light and dark segments a and b of the code tracks 24 and 26. The modulated light is transmitted to the photoelectric detector means 34 by the fiber optic elements 35a and b, 36a and b and 37a and b. The fiber optic elements 35a and b supply their modulated light outputs to the photoelectric sensor elements 41a and b which are on the same substrate 41. Inasmuch as the alternate light and dark segments a and b of the parallel code tracks 24 and 26 are staggered, the code tracks are displaced by an electrical angle of 180 degrees, so that the dual photoelectric sensor elements 41a and b produce balanced push-pull output signals.

Similarly, the fiber optic elements 36a and b supply their modulated light outputs to the photoelectric sensor elements 42a and b, which are on the same substrate 42. The twin photoelectric sensor elements 42a and b produce balanced push-pull output signals.

Likewise, the fiber optic elements 37a and b supply their modulated light outputs to the photoelectric sensor elements 43a and b, which are on a common substrate 43. The dual photoelectric sensor elements 43a and b also produce a balanced push-pull output.

The optical encoder 20 may be employed to commutate an electric motor with a high degree of precision, comparable to the precision achieved by brush type commutators. The provision of three fiber optic cables 35, 36 and 37 for each optical reading unit 28, spaced apart by one third of a code cycle, or 120 electrical degrees, results in a multiplication of the effective code frequency by 3, so that the code has an effective resolution which is 3 times the actual number of code cycles per revolution.

The provision of twin photoelectric sensors or cells on a common substrate is highly advantageous, because the characteristics of both cells are kept the same, even if the cells are subjected to adverse conditions of use, such as wide variations in the temperature, frequency and other operating parameters.

I claim:
1. An optical encoder, comprising
a code member having first and second parallel adjacent longitudinal code tracks,
each of said tracks having alternate segments of relatively high and relatively low reflectivity,
said segments of said first and second code tracks being staggered whereby the segments of relatively high and low reflectivity of said first track are opposite the segments of relatively low and high reflectivity of said second track,
a fiber optic cable assembly including a plurality of fiber optic cables having terminal ends opposite a plurality of longitudinally spaced points along said code member,
means mounting said code member and said fiber optic cables for relative longitudinal movement,
each of said fiber optic cables having first and second light transmitting fiber optic elements with their terminal ends opposite said respective first and second code tracks for illuminating said code tracks,
each of said fiber optic cables having first and second light receiving fiber optic elements disposed with their receiving ends opposite the respective first and second code tracks for receiving reflected light therefrom,
said first light transmitting fiber optic element and said first light receiving fiber optic element of each cable being disposed with their ends adjacent each other with a boundary therebetween extending transversely to the longitudinal direction of said first code track,
said second light transmitting fiber optic element and said second light receiving fiber optic element of each cable being disposed with their ends adjacent each other with a boundary therebetween extending transversely to the longitudinal direction of said second code track,
and an optical illuminating and reading head having a centrally disposed light source,
said head having a plurality of photoelectric detectors grouped around said light source,
one of said photoelectric detectors being provided for each of said fiber optic cables,
said fiber optic cable assembly extending between said code member and said head,
all of said first and second light transmitting fiber optic elements having light receiving ends disposed adjacent one another and opposite said light source to receive illumination therefrom for transmission to said code tracks,
each of said photoelectric detectors having first and second photoelectric sensors sharing a common substrate,
the first and second light receiving fiber optic elements of each of said fiber optic cables having terminal ends opposite the respective first and second photoelectric sensors of the corresponding photoelectric detector for delivering the reflected light thereto.

* * * * *